(12) United States Patent
Ireland et al.

(10) Patent No.: US 7,243,027 B2
(45) Date of Patent: Jul. 10, 2007

(54) METHOD AND SYSTEM TO GENERATE DELIVERABLE FILES

(75) Inventors: Peter J. Ireland, Beijing (CN); James L. Thornton, Austin, TX (US); Gregory H. Wibben, Emden, IL (US); Kamran Waheed, Austin, TX (US); Stephen V. Reski, Austin, TX (US)

(73) Assignee: Schlumberger Technology Corporation, Houston, TX (US)

( * ) Notice: Subject to any disclaimer, the term of this patent is extended or adjusted under 35 U.S.C. 154(b) by 39 days.

(21) Appl. No.: 11/176,042

(22) Filed: Jul. 7, 2005

(65) Prior Publication Data

US 2007/0010947 A1     Jan. 11, 2007

(51) Int. Cl.
    *G06F 19/00* (2006.01)
(52) U.S. Cl. .......................................... 702/6
(58) Field of Classification Search .................... 702/6, 702/17
    See application file for complete search history.

(56) References Cited

U.S. PATENT DOCUMENTS

| | | | |
|---|---|---|---|
| 4,352,166 | A | 9/1982 | Schoonover |
| 4,456,983 | A | 6/1984 | Schoonover |
| 4,558,438 | A | 12/1985 | Jones et al. |
| 4,633,446 | A | 12/1986 | Kesner |
| 5,237,539 | A | 8/1993 | Selman |
| 5,864,772 | A | 1/1999 | Alvarado et al. |
| 5,873,049 | A | 2/1999 | Bielak et al. |
| 6,012,018 | A | 1/2000 | Hornbuckle |
| 6,035,255 | A | 3/2000 | Murphy et al. |
| 6,055,481 | A | 4/2000 | Johansen et al. |
| 6,070,125 | A | 5/2000 | Murphy et al. |
| 6,101,445 | A | 8/2000 | Alvarado et al. |
| 6,128,577 | A | 10/2000 | Assa et al. |
| 6,195,092 | B1 | 2/2001 | Dhond et al. |

(Continued)

FOREIGN PATENT DOCUMENTS

GB    2-319-658    2/2004

OTHER PUBLICATIONS

UK Patents Act 1977 Combined Search and Examination Report Under Sections 17 & 18(3), dated Aug. 18, 2006, regarding Application No. GB-0611702.2 (4 pages).

*Primary Examiner*—D. McElheny, Jr.
(74) *Attorney, Agent, or Firm*—Osha Liang LLP

(57) ABSTRACT

Techniques for generating deliverable files from well logging data include obtaining the well logging data, wherein the well logging data is associated with a unique identifier; outputting a graphical deliverable file based on the well logging data, one or more templates, and a set of graphical deliverable attributes that specify how the graphical deliverable file is to be generated; and outputting an electronic data file comprising the set of graphical deliverable attributes such that the graphical deliverable file can be regenerated from the electronic data file. The well logging data may include all information necessary to recalculate the computed outputs from the raw data (e.g., computational parameters). Other methods include techniques for uniquely associating data and for making the outputs tamper-proof so that a user can compare two different types of outputs (e.g., digital and graphical deliverables) and be confident whether they are from the same source data.

24 Claims, 8 Drawing Sheets

U.S. PATENT DOCUMENTS

| | | |
|---|---|---|
| 6,405,136 B1 | 6/2002 | Li et al. |
| 6,429,882 B1 | 8/2002 | Abdelnur et al. |
| 6,519,568 B1 | 2/2003 | Harvey et al. |
| 6,675,101 B1 | 1/2004 | Shray et al. |
| 6,704,656 B1 | 3/2004 | Abriol et al. |
| 6,751,555 B2 | 6/2004 | Poedjono |
| 6,862,530 B2 | 3/2005 | Fleury et al. |
| 6,885,942 B2 | 4/2005 | Shray et al. |
| 6,917,360 B2 | 7/2005 | Terentyev et al. |

# METHOD AND SYSTEM TO GENERATE DELIVERABLE FILES

BACKGROUND

1. Field of the Invention

The invention relates to data handling and presentation techniques. More particularly, the invention relates to data acquisition and logging systems associated with exploration and production of subsurface resources, for example, oil, gas or water, and preparing deliverable files for customers.

2. Background Art

The exploration for subsurface minerals typically requires various techniques for determining the characteristics of geological formations. Many characteristics, such as the hydrocarbon volume, resistivity, porosity, lithology, and permeability of a formation, may be deduced from certain measurable quantities associated with the geological formations. Drilling of a well to determine the characteristics of the geological formations is a well known technique. A data acquisition and logging "tool" or "system" is typically used to acquire information describing the well characteristics. The well may be, for example, an oil well, but can also be a well for exploration for other subsurface resources, such as gas and water.

Data acquisition and logging systems generally include "Wireline" logging systems, measurements-while-drilling (MWD) systems, logging-while-drilling (LWD) systems, and logging-while-tripping (LWT) systems.

Wireline logging systems typically involve a process by which oil or gas wells are surveyed to determine their geological, petrophysical or geophysical properties using electronic measuring instruments conveyed into the wellbore by means of an armored steel cable, known as a wireline cable. The data acquired by well logging instruments that are secured to the wireline cable are transmitted back to a back-end portion of the data acquisition and logging system located at the surface through electrical conductors in the wireline cable. Conventional wireline technology is well known in the oil and gas industry.

MWD or LWD systems typically make the same measurements as Wireline logging systems, but the measurements are obtained while the well is being drilled. MWD or LWD systems include sensors in the drill-string to obtain the aforementioned measurements. LWT systems use run-in tools that are sent downhole through mud channels in drill strings during drilling or after the drilling operations are finished and before the drill strings are pulled uphole. LWT tools typically make measurements while the drill string is retrieved. These measurements may be transmitted to the surface via mud-pulse telemetry (or similar techniques) while drilling or stored in well logging memory for later retrieval.

The measurements acquired by any tool, such as a wireline, MWD, LWD, or LWT system, and/or data derived from these measurements are typically presented in standard formats (i.e., deliverable files) for delivery to the customers. These deliverable files (reports) are used by the customer to make business decisions. For example, an oil company may use the report to make decisions regarding the commercial feasibility of a particular oil well. In some cases, the deliverable reports may be used by a governmental or regulatory agency to determine whether to grant drilling permits.

Present data acquisition and logging systems typically require the oil field services company (i.e., the company that used the logging tools) to manually prepare deliverable files for each customer. These deliverable files are typically in the standard DLIS format, which is an American Petroleum Institute standard (API RP 66—"Recommended Digital Log Interchange Standard ("DLIS"), V-1.00). In some cases, the oil field services company may use a program or a script to generate the deliverable files. In addition, the services companies typically also provide logs or graphs ("graphical deliverable files," i.e., hardcopy or electronic version of graphs) of the relevant data. The standards for various logs/graphs are covered by API RP31A. In the following description, "electronic data files" (e.g., the DLIS files) may refer to electronic files that contain well logging data, associated information, and/or parameters used to produce the logs, and the graphs/logs (whether physical print or electronic version) will be referred to as "graphical deliverable files" or "graphical deliverables." The electronic data files and graphical deliverable files may be referred to collectively as "deliverable files."

However, conventional electronic data files and graphical deliverable files are often not linked. That is, neither the electronic data files (e.g., DLIS files) nor the graphical deliverable files include information indicating that they are linked or information relating to how the graphical deliverables are generated from the data deliverables. In addition, computational parameters used in data manipulation and graph generation are typically not included in such deliverable files. As a result, it is difficult to ascertain that the electronic data files actually correspond to the graphical deliverable files and it is difficult, if not impossible, to recreate the graphical deliverable files. This could present a serious problem because the graphical deliverable files can be easily altered, and a small change to the data can make a large impact on the client's decisions. Furthermore, it will be difficult for the client to reproduce the graphical deliverable files from the electronic data files. As noted above, the electronic data files (e.g., DLIS files) typically include only the well log data and the well related information, but not the settings/parameters used to generate the graphical deliverables. Thus, the client must infer or deduce certain variables, parameters, etc. in order to reproduce the graphs or to verify the authenticity of the graphs in order to generate an accurate model of the well.

In order for a client to make an informed decision, the client may want to extract the information from the deliverable files, create a model of the well on their own system, and then perform various types of analysis on the model to determine how to ultimately proceed. Thus, there is a need for methods and systems to have deliverable files that include the necessary information to facilitate these processes or to have deliverable files that are traceable and/or not easily altered.

SUMMARY

One aspect of the invention relates to methods for generating a deliverable file from well logging information. A method for generating deliverable files from well logging data in accordance with one embodiment of the invention includes obtaining the well logging data, wherein the well logging data is associated with a unique identifier; outputting a graphical deliverable file based on the well logging data, one or more templates, and a set of graphical deliverable attributes that specify how the graphical deliverable file is to be generated; and outputting an electronic data file comprising the set of graphical deliverable attributes such that the graphical deliverable file can be regenerated from the electronic data file. In some embodiments, graphical deliverable files may also display one or more unique identifiers such that the graphical deliverable files may be traced back to the original digital data files.

Another aspect of the invention relates to systems for generating a deliverable file from well logging information. A system for generating a deliverable file from well logging information in accordance with one embodiment of the invention includes a data repository storing data that include well logging data, wherein the well logging data is associated with a unique identifier; and a deliverable generation component configured to: obtain the well logging data from the data repository, output a graphical deliverable file based on the well logging data, one or more templates, and a set of graphical deliverable attributes that specify how the graphical deliverable file is to be generated, and output an electronic data file comprising the set of graphical deliverable attributes such that the graphical deliverable file can be regenerated from the electronic data file.

Other aspects of the invention will be apparent from the following description and the appended claims.

DETAILED DESCRIPTION

Figure 1:
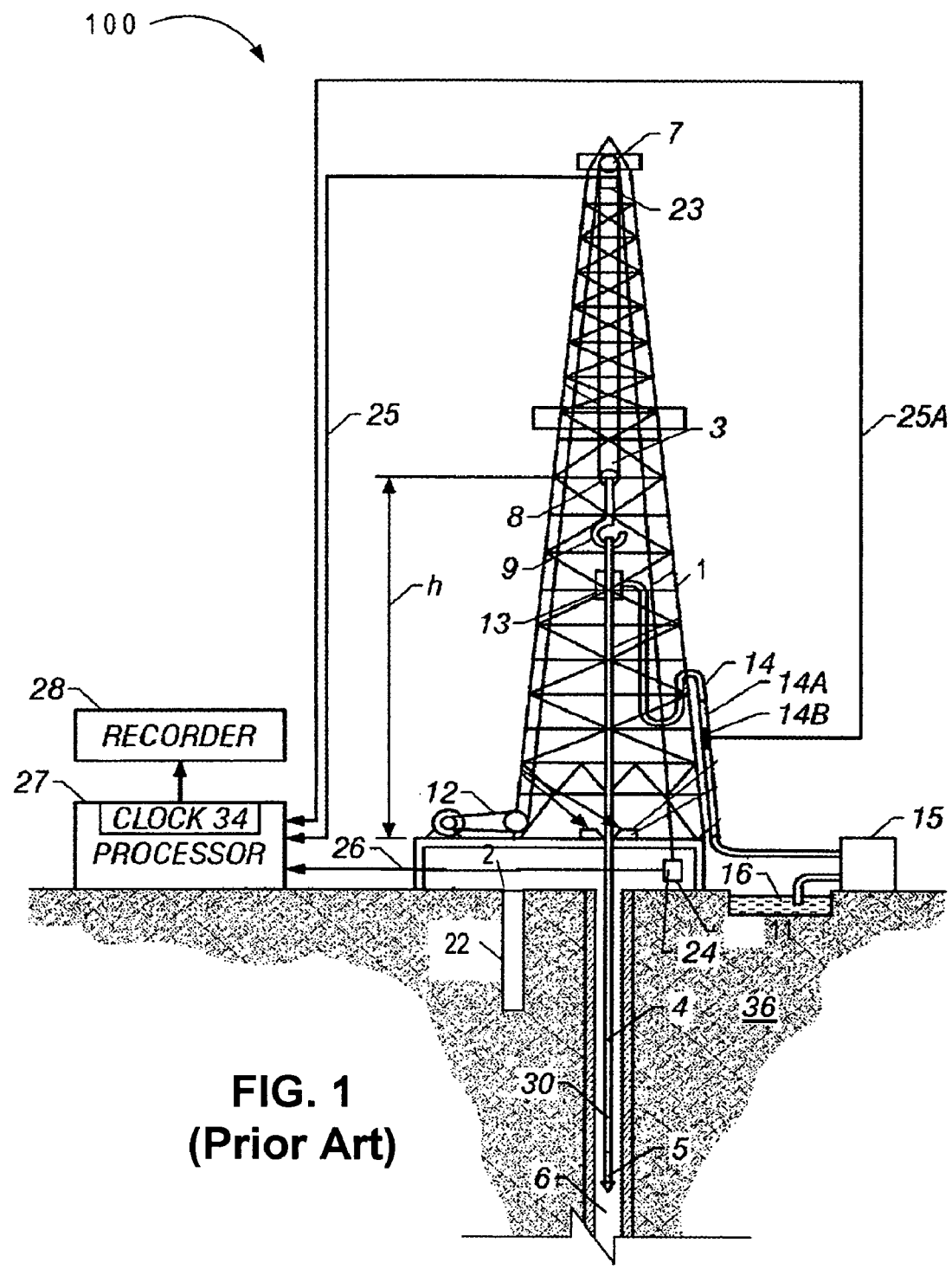
FIG. 1 shows a prior art drilling rig and drill string that can be used with one embodiment of the invention.

Exemplary embodiments of the invention will be described with reference to the accompanying drawings. Like items in the drawings are shown with the same reference numbers.

In the following description, some embodiments of the invention are provided with specific details in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to methods and systems for generating deliverable files. In some embodiments of the invention, electronic data deliverable files may include information necessary to regenerate graphical deliverables. In some embodiments of the invention, well logging data used to generate the deliverable files are associated with at least one globally unique identifier, thereby enabling a user to track the well logging data used to generate the deliverable files. The electronic data deliverable files may include information (i.e., parameters) related to the generation of the logs (graphical deliverables) such that particular logs may be correlated with the electronic data deliverable files or the electronic data deliverable files may be used to regenerate the same graphs or logs by a user at a later time without having to deduce the parameters used to produce the logs. In some embodiments of the invention, the deliverable files may be converted into secure deliverable files, thereby preventing individuals from modifying the contents of the deliverable files or making any such changes traceable. In some embodiments of the invention, previously defined system-wide data set tier information may be used to generate deliverable files.

Figure 2:
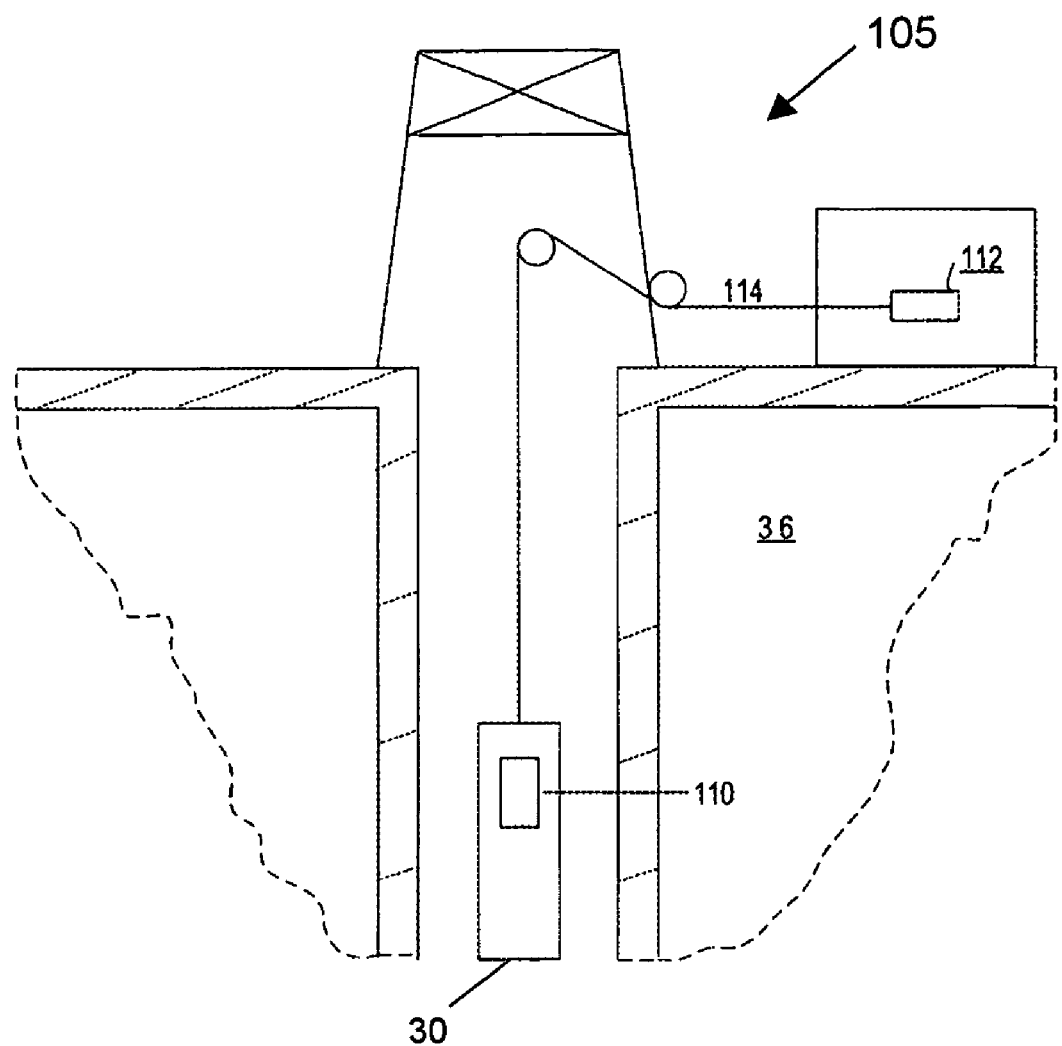
FIG. 2 illustrates a prior art wireline logging system that can be used with an embodiment of the invention.
Figure 3:
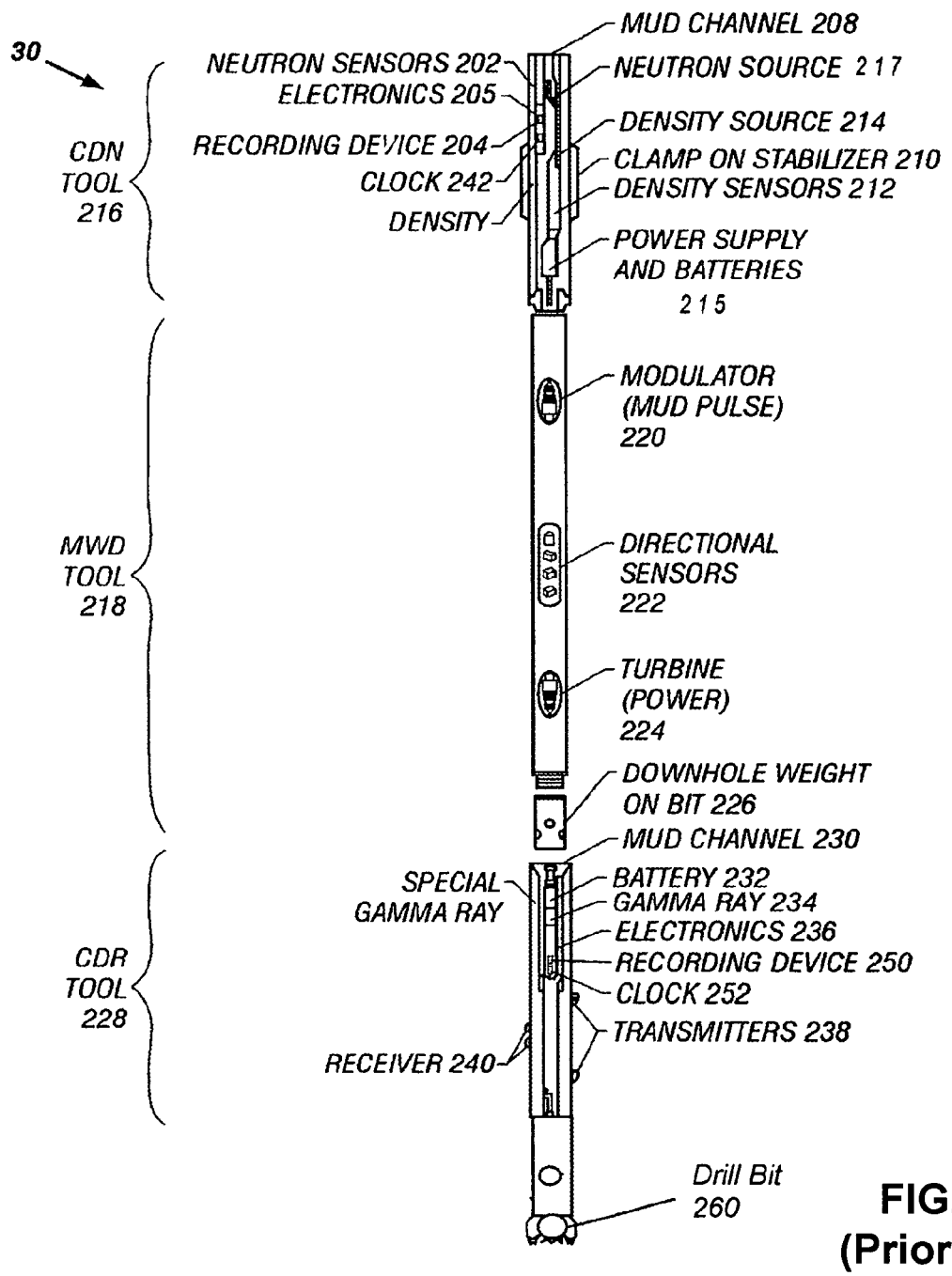
FIG. 3 illustrates a drilling tool with several well logging tools in accordance with one embodiment of the invention.

FIG. 1 through FIG. 3 describe various well logging systems which may be used to obtain well logging data and other well logging information (described below). The well logging data and other well logging information obtained by the well logging systems shown in FIG. 1 through FIG. 3 may be used to generate deliverable files in accordance with one or more embodiments of the invention as illustrated and described herein.

FIG. 1 illustrates a drilling rig (100) and drill string with a well logging data acquisition and logging system for exploring a formation (36). Drill string (4), which includes a drill bit (5) on one end, is suspended from hook (9) by means of swivel (13) linked by hose (14) to mud pump (15), which permits the injection of drilling mud into well (6), via the hollow pipes of drill string (4). The drilling mud may be drawn from mud pit (16). Hose (14) is attached to standpipe (14A). One or more sensors (14B) attached to standpipe (14A) may receive signals from within the well (6) via mud pulse telemetry. Mud pulse telemetry sensors (14B) are coupled via signal line (25A) to processor (27). Accordingly, sensors (14B) function together with measurement tools for delivering well logging data to the processor (27) and a recorder (28). In one or more embodiments of the invention, the processor (27) includes a clock (34) for providing a time measurement, as described in greater detail below. The drill string may be elevated by turning lifting gear (3) with a winch (12).

The lowermost portion of the drill string (4) may contain one or more tools. The embodiment shown in FIG. 1 includes a logging tool (30) for investigating well drilling conditions or formation properties. The tool (30) is capable of logging one or more different types of measurements and includes at least one measurement sensor. For example, the tool (30) may be equipped for logging measurements of resistivity, gamma ray, density, neutron porosities, calipers, photoelectric effect, etc. In addition, the tool (30) may include sensors for obtaining drilling-related measurements such as direction, depth, inclination, as well as equipment for data recording and telemetry.

In one or more embodiments of the invention, variations in height (h) of a traveling block (8) during drill string raising operations are measured by means of sensor (23). The sensor (23) may be an angle of rotation sensor coupled to the faster pulley of a crown block (7). The sensor (23) and a strain gauge (24) are connected by signal lines (25, 26) to the processor (27).

The data acquisition and logging system is typically used to acquire information describing the oil well characteristics. The information may be acquired in real-time by logging tool (30) and communicated to the back-end portion of the data acquisition and logging system. Alternatively, the well logging data may be acquired and recorded in memory in downhole tools for later retrieval.

FIG. 2 illustrates a wireline logging system (105) in accordance with an embodiment of the invention. As shown in FIG. 2, a transmitter (110) receives the acquired well logging data from sensors included in the wireline tool (30). The transmitter (110) communicates the acquired well logging data to a surface processor (112) via a logging cable (114). The logging cable (114) is commonly referred to as a wireline cable. In one or more embodiments of the invention, the processor (112) or a back-end portion (not shown) of the wireline logging system may include a computer system to process the acquired well logging data.

FIG. 3 illustrates a logging tool having several sensors in accordance with one embodiment of the invention. As shown in FIG. 3, logging tool (30) includes three portions: CDN™ tool (216), mark of Schlumberger, MWD tool (218), and CDR™ tool (228), mark of Schlumberger, each of which may be included or excluded for a particular application.

The CDN™ tool (216) may include neutron sensors (202), a neutron source (217), a density source (214), clamp on stabilizers (210), density sensors (212), and power supply and batteries (215). The CDN™ tool (216) further provides a mud channel (208) that enables mud to flow through the CDN™ tool (216). Further, the CDN™ tool (216) includes electronics (205) such as a recording device and a clock.

As shown in FIG. 3, the MWD tool (218) may include a modulator (220) for transmitting well logging data via the mud channel (208), directional sensors (222) configured to measure the orientation and/or location of the drilling tool (30), and a turbine (224) configured to provide power to the drilling tool (30). The MWD tool (218) may further include a downhole weight-on-bit sensor (226).

As shown in FIG. 3, the CDR™ tool (228) may include a mud channel (230), a battery (232), gamma ray equipment (234), electronics (236), transmitters (238), and receivers (240). The electronics (236) may include a recording device (250) coupled to a clock (252). Depending on the configuration of the logging tool (30), the CDR™ tool (228) or the MWD tool (218) is coupled to a motor and a drill bit (260).

Figure 4:
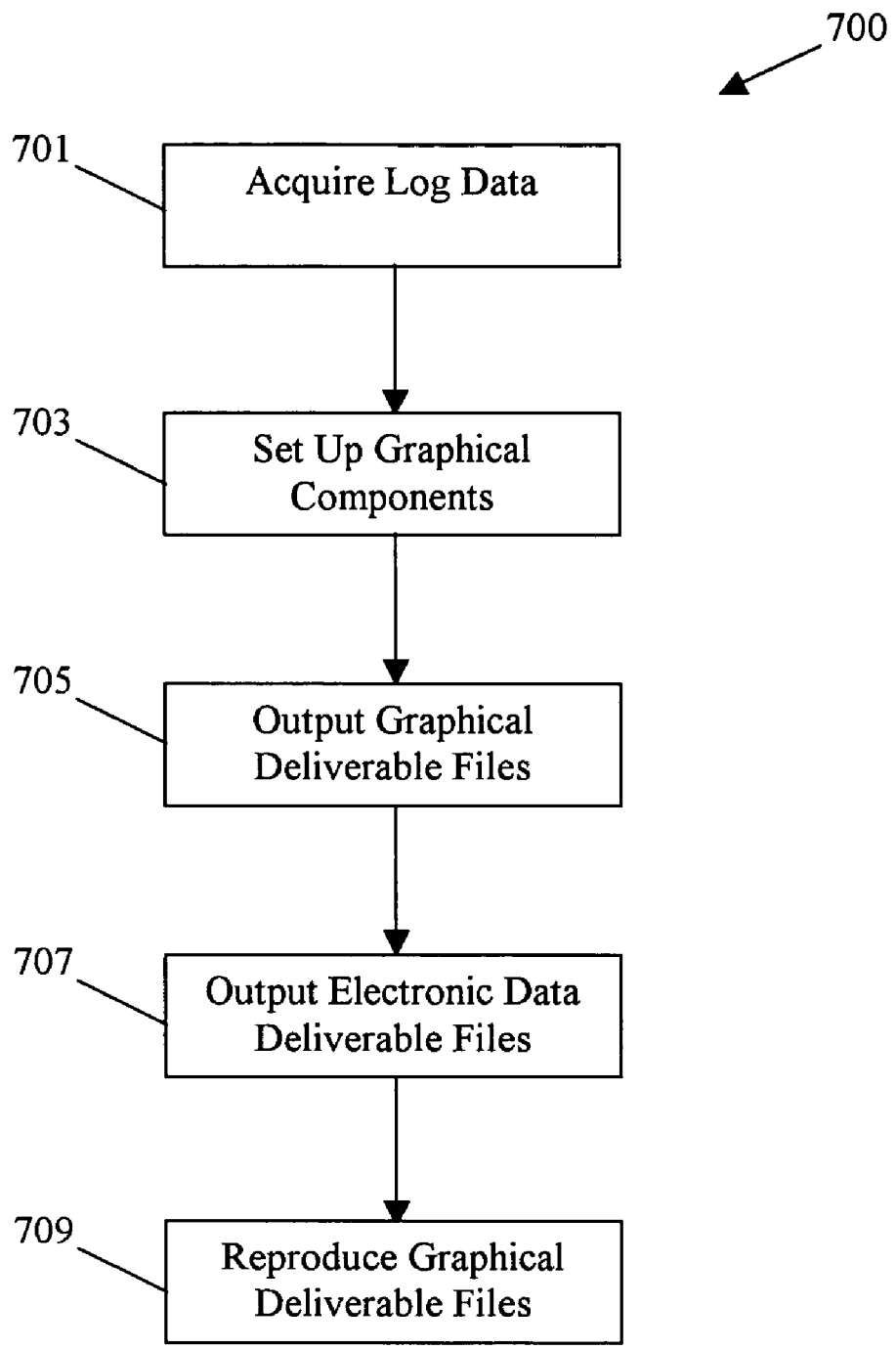
FIG. 4 shows a flow chart of a method in accordance with one embodiment of the invention.

As noted above, logging data, obtained with any logging tool, such as those shown in FIGS. 1–3, may be used to generate deliverable files in accordance with embodiments of the invention. Logging data may include raw data and computed outputs, along with their associated acquisition settings and computations parameters. Computed outputs are calculated from the acquired data using computational parameters. FIG. 4 summarizes a method in accordance with one embodiment of the invention. As shown in FIG. 4, a method 700 may include acquiring log data (ST701), using a tool as shown in FIGS. 1–3, for example. The data obtained in this step (ST701) may include acquisition settings, raw data, computed outputs and computational parameters. One or more templates may then be used to set up graphical components for the presentation of the data to be delivered to customers (ST703). In accordance with embodiments of the invention, a graphical deliverable may comprise a sequence of components, each of which may be defined using a template. The templates specify how each component of the graphical deliverable files is to be presented, what information to include, etc. The components thus generated are then assembled to produce the graphical deliverable files. How the components are assembled in a graphical deliverable file is defined in a set of parameters, referred to as "graphical deliverable attributes." The graphical deliverable files are then generated based on the well logging data and the output parameters (ST705), and Graphical Deliverable Attributes, which define the sequence of the graphical components. The graphical deliverable files may be physical prints or digital files for the graphs (or logs).

The data (including logging data and information used for the generation of the deliverable files—acquisition settings, computational parameters, raw data, computed outputs—and templates and graphical deliverable attributes) may be stored on a computer system (e.g., a database or data depository) or a computer readable medium. In accordance with some embodiments of the invention, the computer system may then use the stored data to generate the deliverable files (graphs, electronic version of logs, and electronic data files—DLIS files).

In addition to the graphical deliverable files, electronic data deliverable files may also be output (ST707), which may be part of the deliverable files to be delivered to the customer. The electronic data files in accordance with embodiments of the invention may include computational parameters used to generate computed outputs, and the templates and graphical deliverable attributes used to generate the graphical deliverable files (physical prints and/or electronic versions of the logs). Therefore, either the computed outputs can be regenerated at a later time, or the graphical outputs may be regenerated from the electronic data files at a later time (ST709). An electronic data file of the invention can enable a user to regenerate the original computed data from the raw data without having to deduce the computational parameters used in producing the original computed outputs, as presented in the graphical deliverable (in the form of graphs or logs). Furthermore, electronic data files of the invention may also be used to verify that the graphical outputs indeed correspond exactly to the electronic data files by using the Unique Identifier.

Note that FIG. 4 summarizes an exemplary method of the invention. Some embodiments of the invention may not include all steps shown in FIG. 4. For example, an embodiment of the invention may use log data from earlier logging operations, i.e., there is no need to perform the logging operation (ST701). Similarly, an embodiment of the invention need not involve regeneration of the original graphs or logs (ST709).

Figure 5:
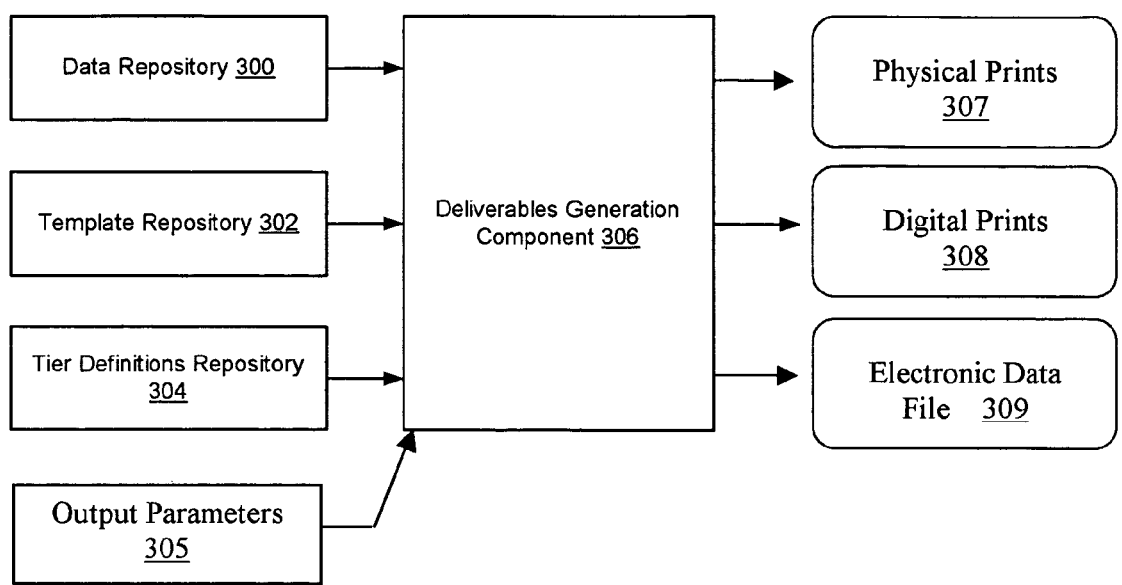
FIG. 5 shows a system in accordance with one embodiment of the invention.

In accordance with some embodiments of the invention, ST703 through ST707 may be performed by a single function. For example, FIG. 5 shows a deliverable generation component (306) in accordance with one embodiment of the invention. As shown in FIG. 5, the deliverable generation component (306) may use log data in a data repository (or database) (300) and templates from a template repository (302) to produce deliverable files. The deliverable generation component (306) may also include output parameter information (305) related to how graphs (logs) are generated in the graphical deliverable files. The deliverable files may include physical prints (logs) (307), digital version of the logs (308), and electronic data files (e.g., DLIS files) (309), for example. The output parameter information (305) may include how the data and templates are put together, in what order the templates appear in the physical print (307) and graphical deliverables (308), etc. In accordance with some embodiments of the invention, the deliverable generation component (306) may also use the tier definition information from a tier definitions repository (304) to produce deliverable files according to customer requirements. Note that while various repositories are shown separately in FIG. 5, one of ordinary skill in the art would appreciate that some or all of these repositories may be combined into a single repository (database).

Figure 6:
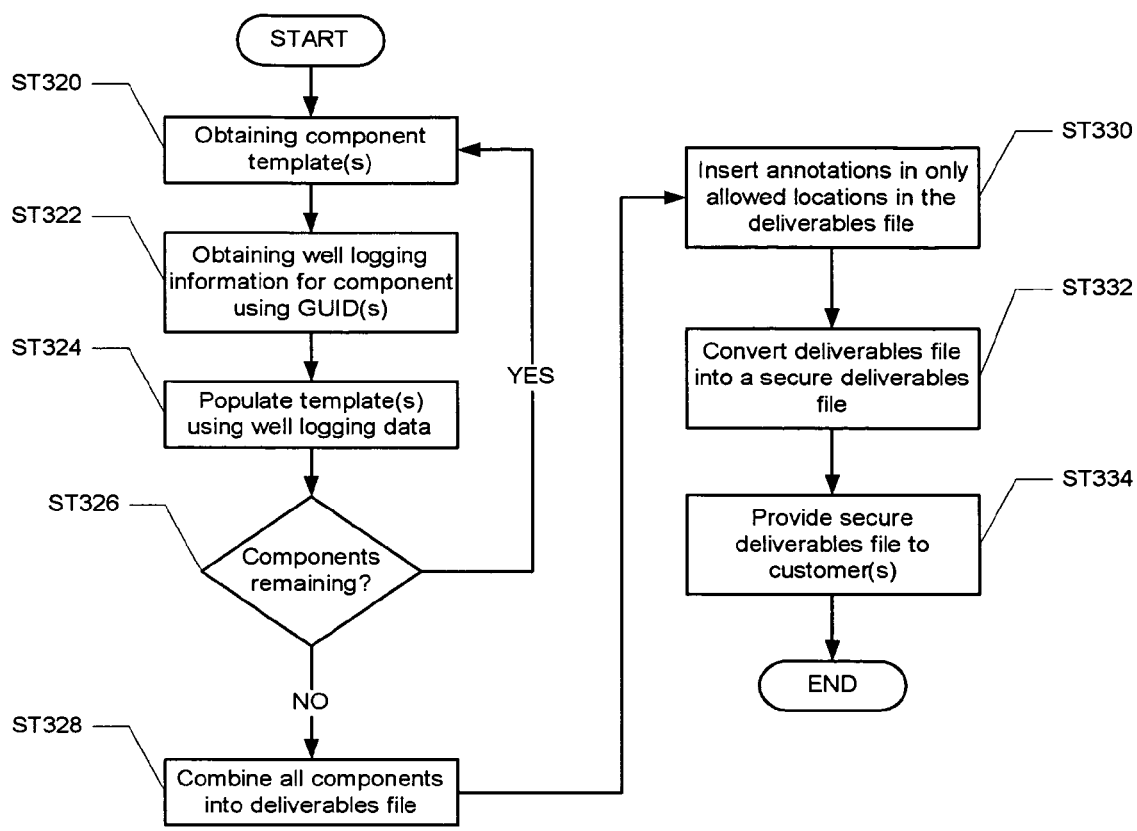
FIG. 6 shows a flow chart in accordance with one embodiment of the invention.
Figure 7:
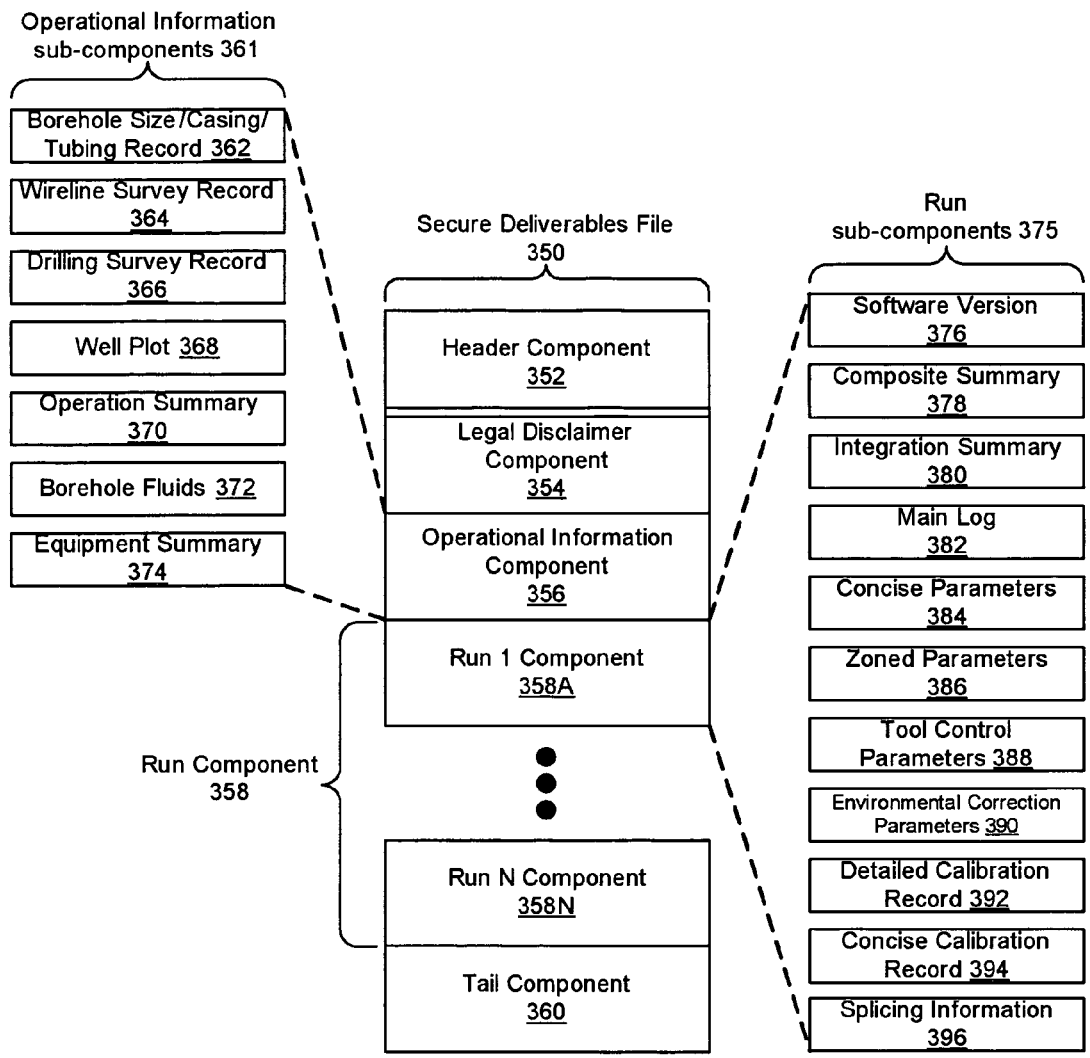
FIG. 7 shows a deliverable file in accordance with one embodiment of the invention.

Each of the aforementioned repositories is operatively connected to the deliverables generation component (DGC) (306). In general, the DGC (306) includes functionality to obtain data from each of the aforementioned repositories and use the data to generate deliverable files. An exemplary embodiment of the operation of the DGC (306) is shown in FIG. 6 and discussed below. In general, the deliverable files may include output information necessary to re-create the contents of the graphical deliverables (printouts or electronic version), or more specifically, the individual components in the graphical deliverables. An example of the contents of the deliverable file is shown in FIG. 7 and discussed below.

Referring again to FIG. 5, in accordance with embodiments of the invention, the data repository (300) stores well logging information obtained using a well logging tool, such as the ones described in FIG. 1 through FIG. 3. In general, well logging information refers to any and all information associated with a particular well logging job or several well logging jobs. The well logging information may include the original well logging data (i.e., the measurements obtained using the well logging tools for a particular run (or set of runs)), manipulated well logging data (i.e., well logging data which has been corrected for tool/environmental effects using correction factors, well logging data which has been spliced together, etc.), and additional information associated with how the well logging data are obtained, such as wireline survey records, drilling survey records, well plots, operation summaries, information about borehole fluids, equipment summaries, information about the version of software used by the well logging tools, composite summaries, integration summaries, information about zoned parameters, information about tool-control parameters, information about environmental correction parameters, etc. In this description, "well logging data" is used in a broad sense to include the associated information about the well or the logging operations.

In one or more embodiments of the invention, the aforementioned pieces of well logging information stored in the data repository (300) may be associated with one or more unique identifiers (unique ID). Unique data identifiers have been previously used to label well log data. See e.g., U.S. Pat. No. 6,704,656 issued to Abriol et al. However, the prior art approach typically uses a unique identifier for a data set that represents a group of related measurements. Furthermore, in prior art approaches, the output files (printouts or electronic versions) typically do not have a unique ID. Instead, the ID of the input data set may be used on all outputs, i.e., the output files or prints bear the ID of the source files. Therefore, after several operations, it would be difficult or impossible to trace the file history or the relationships between various files.

In contrast, the unique ID in accordance with embodiments of the invention is globally unique and allows computer systems to uniquely identify any object used in the systems, regardless of input or output files. In accordance with some embodiments of the invention, each data set may be provided with a unique ID. In accordance with other embodiments of the invention, each piece of data in a data set may also be associated with a unique ID. Those skilled in the art will appreciate that a single unique ID system may be used globally for the identification of well logging information from any well logging job, including multiple jobs performed in the same well or multiple jobs from related wells, for example.

Further, in one or more embodiments of the invention, each time a piece of data previously stored in the data repository (300) is manipulated/modified or combined with another piece of data, a new unique ID may be associated with the resulting data. Further, the resulting data (i.e., the modified/manipulated or combined data) is stored in a separate file from the originating data (i.e., the data used to create the resulting data). In this manner, embodiments of the invention enable data tracking within the system. Further, in various embodiments of the invention, modifications to the data within the data repository may also be tracked.

Those skilled in the art will appreciate that the aforementioned unique IDs may be created using methods and algorithms known in the art or may use an existing ID system. For example, globally unique IDs, such as Microsoft® GUIDs, can be used as a truly unique identifier for each set of data. In accordance with embodiments of the invention, a GUID may be written out with each data— whether it is to a digital deliverable (e.g. DLIS) or a graphical deliverable. Therefore, someone who wishes to use the data can quickly compare the GUID in the DLIS file with the GUID in the graphical deliverable, and be very confident that the data used in both is the same.

In accordance with embodiments of the invention, graphical deliverable files (physical prints or digital versions) may be output with any method known in the art. For example, the graphical outputs may be assembled from various components that display log data. In accordance with one embodiment of the invention, a template repository (302) includes templates used in the generation of deliverable files. More specifically, the template repository (302) may include templates for each of the components, which make up the deliverable files, such as a header component, a legal disclaimer component, an operational information component, a run component, and a tail component. Further, in one or more embodiments of the invention, each of the aforementioned components may have sub-components. If a given component includes sub-components, then the template repository (302) may include one or more sub-component templates. Those skilled in the art will appreciate that multiple sub-component templates may be combined together to generate a component template.

In general, the templates (both component templates and sub-component templates) may define the layouts of the well logging information in the deliverable files. In one or more embodiments of the invention, the templates (both component templates and sub-component templates) may include one or more fields that may be populated by well logging information and/or information (output parameters) related to how the logs (graphical deliverables) are generated. The templates (both component templates and sub-component templates) may be obtained from any source. In addition, the templates (both component templates and sub-component templates) may be changed at any time and new templates may also be added and/or removed from the template repository (302) at any time. In one or more embodiments of the invention, the templates may be coded in eXtensible Mark-up Language (XML). Those skilled in the art will appreciate that the templates (both component templates and sub-component templates) may be coded in any language.

In one or more embodiments of the invention, the tier definitions repository (304) may include one or more tier definitions. A tier definition may correspond to a mapping of one or more channels from one well logging tool to one or more channels from a second well logging tool. The tier definitions provide a uniform framework for mapping channels of one well logging tool to another. The following is an example of how the aforementioned tier definitions may be used. The example is not intended to limit the scope of the invention.

Consider a scenario in which a customer would like well logging information provided by the Stratigraphic High-Resolution Dipmeter Tool (SHDT™), mark of Schlumberger. However, SHDT™ has been replaced with a next generation tool—the Formation MicroImager (FMI™) tool, mark of Schlumberger. In this scenario, the oil field services company uses the FMI™ tool to log the well. The resulting well logging information provided by the FMI™ tool is significantly more detailed than the well logging information that would have been provided by the SHDT™. However, since the customer only requested well logging information that would have been provided by the SHDT™, the oil field services company must determine which of the channels (FMI™ has 192 channels that are of particular interest) corresponds to the channels of the SHDT™ (SHDT™ has 6 channels that are of the same type of interest as the 192 in the FMI™). In this scenario, the oil field services company may use the appropriate tier definition(s) to map the channels from the FMI™ tool to the SHDT™ and deliver only the relevant channel data to the customers.

In addition, those skilled in the art will appreciate that using the tier definitions, the oil field services company may be able to zone the well (based on, for example, depth) and then provide various amounts of information for each zone as requested by the customer. For example, in the above scenario, the oil field services company can provide the SHDT™ equivalent logs for zone 0–300 ft (0–100 m) and the FMI™ logs for other zones (e.g., zone 300 ft–1000 ft (100–333 m)).

In addition to the aforementioned tier definitions, the tier definitions may include subsets of channels provided by a single well logging tool, thereby enabling a customer to select a specific channel (or a set of channels). Those skilled in the art will appreciate that embodiments of the invention may use these and other tier definitions. In addition, those skilled in the art will appreciate the tier definitions may be obtained from any source, modified at any time, and coded in any language.

As noted above, the deliverable generation component (306) may also include output parameter information (305) that specifies how graphical outputs are generated in the deliverable files, including the order/arrangements of various templates in the outputs. The output parameter information (305) may be from a library of commonly used graphing parameters or supplied by the user.

In accordance with embodiments of the invention, the data repository (including raw data, acquisitions settings, computational parameters and computed outputs) (300), the template repository (302), the tier definitions repository (304), graphical deliverable attributes (305), and the DGC (306) may all be located on a single system or on separate systems connected via a network. Further, a system implementing one or more embodiments of the invention may include one or more instances of one or more of the data repository (300), the template repository (302), the tier definitions repository (304), graphical deliverable attributes (305), and the DGC (306).

The deliverable generation component (306) shown in FIG. 5 may use any process known in the art to assemble the necessary data and templates to produce the deliverable files. FIG. 6 shows one exemplary process in accordance with one embodiment of the invention. Initially, the deliverable generation component (306 in FIG. 5) performs ST320–ST326 (discussed below) to generate the individual components of the deliverable files. In generating the individual components, the deliverable generation component initially selects one or more templates for a particular component (e.g., header component, legal disclaimer component, operational information component, run component, tail component, etc.) (ST320). Those skilled in the art will appreciate that ST320 may include obtaining both component templates and sub-component templates.

Once the component templates (and, in some cases, sub-component templates) have been obtained, the well logging information is obtained, for example, based on one or more unique IDs (ST322). As discussed above, the well logging information (and individual pieces of data/information that make up the well logging data) is associated with one or more unique IDs. Thus, the deliverable generation component (DGC) may use the unique IDs to retrieve the well logging information from the data repository. The process of obtaining proper templates (ST320) and proper well logging information (ST322) typically would be based on information (shown as (305) in FIG. 5) related to what are to be included in the output files.

Once the component templates and corresponding well logging information have been obtained, the DGC may proceed to populate the templates (include sub-component templates) with the corresponding well logging information (ST324). In one or more embodiments of the invention, populating the template(s) with the corresponding well logging information may result in one or more graphical portions (e.g., images of equipment, main log, well plot, etc) within the component. In addition, the acquisition setting and computational parameter information may be included in the output files. The acquisition settings and computational parameter information may be included as part of the information in one or more templates. Alternatively, the acquisition setting and computational parameter information may be included in a template by itself, for example, using this information to populate a template in ST324. The DGC then determines whether there are any remaining components to generate (ST326). If there are additional components to generate, then ST320–ST326 are repeated until all components to be included in the deliverable file have been generated. Those skilled in the art will appreciate that the ST320–ST326 may be performed in a different order from the order presented in FIG. 6. Those skilled in the art will also appreciate that rather than generating the components individually, the DGC may obtain all templates and the corresponding well logging information and produce the all components in batch mode. Those skilled in the art will also appreciate that ST320–ST324 (described above) may also include obtaining and applying the one or more tier definitions from the tier definition repository In addition, ST324 (described above) may include manipulating/combining specific portions of the well logging information prior to populating the templates. For example, ST324 may involve splicing together various well logging data obtained from various runs to obtain a main log (described below in FIG. 7). The DGC may support any splicing model. Some common splicing models include straight-line splicing (i.e., all channels were spliced together at the same depth) and per-channel splicing (i.e., splicing performed on a per-channel basis). Various splicing techniques related to per-channel splicing are described in U.S. Pat. No. 6,760,665. This patent is assigned to the present assignee and is incorporated by reference in its entirety.

Referring again to FIG. 6, once all components are generated, they may be combined into one or more deliverable files (ST328). As shown in FIG. 5, the deliverable files may be a printout (307), an electronic version of a graph (308) or an electronic data file (309). In accordance with embodiments of the invention, the information related to how the output files are generated (shown as (305) in FIG. 5) is also included in the deliverable files such that the correspondence between the various forms of the outputs may be verified and graphical outputs may be regenerated from the electronic data files. This information may be included in the deliverable files in ST328 or ST324. If it is done in ST324, this information may be included in some or all of the template components or in a separate template.

Those skilled in the art will appreciate that the deliverable files may be in any format. If the individual components are in different formats, then the DGC may include functionality to convert all these components into a single format prior to combining the individual components into a deliverable file.

Once the deliverable files are generated (ST328), they may be delivered to the customers. Alternatively, a user of the DGC may be allowed to insert annotations in the deliverable file (ST330). In accordance with embodiments of the invention, the locations where the user (or in some cases the DGC) may insert annotations may be governed by the DGC. In one or more embodiments of the invention, the information governing the locations in which annotations may be inserted may be encoded within the templates (or sub-templates) for each of the components. As an alternative, the DGC may include a configuration file (or an equivalent mechanism) which provides a set of rules which govern the locations in which annotations may be inserted. Once the annotations (if any) have been added, the deliverable file (including any annotations) may be converted into a deliverable file (ST332). The modified files may then be saved back into the system with a new unique ID.

As noted above, the deliverable files may include physical prints (logs), electronic versions of the logs, and the electronic data files (e.g., DLIS files). In one or more embodiments of the invention, the electronic versions of the logs and the electronic data files may be in a secure format, a tamper-resistant format, and/or a format that permits any change to the files to be traceable. This may be accomplished by converting the deliverable files into a format that cannot be easily altered by a user or if any change is made, it can be easily traced. One example of such a secure file format is the portable document format (PDF). In one or more embodiments of the invention, the DGC may include the necessary functionality, which for example may be provided by a plug-in from Adobe® Systems, Inc, to convert the deliverable file (including any annotations) into PDF. One of ordinary skill in the art would appreciate that other suitable file formats may also be used without departing from the scope of the invention.

Further, in one or more embodiments of the invention, the deliverable file, in addition to being converted into a more secure file format (e.g., PDF), may be secured using a randomly generated password. Those skilled in the art will appreciate that any mechanism for generating a random password may be used. Further, the length of the random password may be determined on an implementation-by-implementation basis. The use of a randomly generated password provides an additional mechanism to prevent (or at least limit) any tampering of the secure deliverable file. Once the secure deliverable file has been generated, the secure deliverable file may be provided to the customer (ST334). The secured deliverable files may be digital version of the prints or electronic data files (e.g., DLIS files).

FIG. 7 shows an example of secure deliverable file in accordance with one embodiment of the invention. More specifically, FIG. 7 shows the individual components (including sub-components) in a deliverable file (a secure deliverable file is shown in this example) in accordance with one embodiment of the invention. As shown in FIG. 7, the secure deliverable file (350), for example, may include the following components: a header component (352), a legal disclaimer component (354), an operational information component (356), one or more run components (358A, 358N), and a tail component (360). Each of the aforementioned components is described below.

In one embodiment of the invention, the header component (352) may include information that may be used to identify the particular deliverable file (350) as well as general background information about the type of information contained in the deliverable file. For example, the header component (352) may include a customer name, information about the field in which the logged well is located, information about the logged well (e.g., the unique well ID, etc.), log intervals, acquisition dates, index units, depth index sources, conveyance (e.g., Wireline), rig type, rig name, well logging tool used, etc.

In one embodiment of the invention, the legal disclaimer component (354) may include a legal disclaimer by the oil field services company that obtained the well logging information and/or prepared the secure deliverable file (350). The legal disclaimer may be in any language (or in multiple languages) and may include the appropriate language required in the jurisdiction of the oil field services company and/or the jurisdiction of the customer.

In one or more embodiments of the invention, the operational information component (356) may include the operational information of various elements at the well site. In one or more embodiments of the invention, the well logging information associated with the operational information component (356), for example, may be grouped into the following operational information sub-components (361): borehole size/casing/tubing record (362), wireline survey record (364), drilling survey record (366), well plot (368), operation summary (370), borehole fluids (372), and equipment summary (374). Each of the aforementioned operational information sub-components is described below.

In one or more embodiments of the invention, the borehole size/casing/tubing record (362) sub-component may include well logging information associated with the borehole size, casing, and tubing. In other embodiments of the invention, the borehole size/casing/tubing record (362) sub-component may include the following information: bit size (e.g., drilled to depth information, casing size, tubing size, or weight). In one or more embodiments of the invention, the wireline survey record (364) sub-component may include the following well logging information recorded at various depths: measured depth, true vertical depth, deviation (measured in degrees), azimuth (measured in degrees), source (i.e., the name of the well logging tool used to obtain measurements), additional remarks about the measurements obtained at the specific measured depth, etc.

In one or more embodiments of the invention, the drilling survey record (366) sub-component may include the following well logging information: survey calculation information (e.g., vertical selection information, DLS method, etc.), depth reference information (e.g., TVD reference datum, target azimuth, etc.), geomagnetic data (e.g., magnetic dip, field strength, magnetic declination etc.), slim pulse reference criteria (e.g., dip, longitude, latitude, etc.), corrections information (e.g., grid convergence, magnetic declination, total correction magnetic north to true north, etc.), etc. In other embodiments of the invention, the well plot (368) sub-component may include the following plots: true vertical depth vs. vertical select plot and latitude (N/S) vs. departure (E/W) plot.

In one or more embodiments of the invention, the operation summary (370) sub-component includes well logging information associated with the operational parameters for each run. The operational parameters for each run may include, but are not limited to, the date the log was started, the time the log was started, the date the log was finished, the time the log was finished, the bit size, the bit start depth, the bit stop depth, the top log interval (i.e., the shallowest reading of a primary output, such as resistivity and density), the bottom log interval (i.e., deepest reading of a primary output, such as resistivity and density), the total depth of the data log (typically used only when a wireline well logging tool is used), the total depth driller (i.e., the sum of the lengths of each stand of the drill pipe, as reported by the driller), the maximum hole deviation, the maximum hole azimuth, logging unit number, logging unit location, information about the person who recorded the well log, information about the person who witnessed the well log being obtained, the service order number, etc.

In one or more embodiments of the invention, the borehole fluids (372) sub-component may include the following well logging information for each borehole fluid present/used when the well log is obtained: information about the type of fluid in borehole (e.g., chem-gel, etc.), fluid level information, surface temperature maximum borehole temperature information, information about the source of the sample (e.g., flowline, etc. ), borehole fluid salinity, density, borehole fluid viscosity, fluid loss, the pH of borehole fluid, date/time circulation stopped (i.e., date/time logger reaches the bottom), resistivity at surface temperature, resistivity at the bottom hole temperature, electrical stability of the borehole fluids, etc. In one or more embodiments of the invention, one or more portions of the above well logging information associated with the borehole fluids may be included in the deliverable file on a per-zone (e.g., depth range) basis.

In one or more embodiments of the invention, the equipment summary (374) sub-component may include images of the well logging tools used to obtain the well log. Further, in one or more embodiments of the invention, the images of the well logging tools may be annotated with information such as the name of the well logging tool, locations of various sensors, orientation of various portions of the well logging tool, depths at which samples were taken, start and/or stop depths of the well logging tools, etc.

In one or more embodiments of the invention, the run component (358) may include well logging information associated with each run. In one or more embodiments of the invention, there is one run component (358) for each run (e.g., 358A, 358N). In one or more embodiments of the invention, each run component (e.g., 358A, 358N) may include the following run sub-components (375): software version (376), composite summary (378), integration summary (380), main log (382), concise parameters (384), zoned parameters (386), tool-control parameters (388), environmental correction parameters (390), detailed calibration record (392), concise calibration record (394), and splicing information (396). Each of the aforementioned run sub-components (375) is described below.

In one or more embodiments of the invention, the software version (376) sub-component may include information about the software used to obtain the well logging data. In one or more embodiments of the invention, the following well logging information may be included in the software version (376) sub-component: software name, system software version, and firmware software version.

In one or more embodiments of the invention, the composite summary (378) sub-component may include information about the well logging data used to generate the main plot (discussed below). In one or more embodiments of the invention, the composite sub-component may include the following well logging information about each piece of well logging data: a unique ID identifying the well logging data, a description of the well logging data, a start depth, a stop depth, an acquisition time, and an acquisition date.

In one or more embodiments of the invention, the integration summary (380) sub-component may include information about the accumulations obtained from any integrated channels that are shown in the main log (described below). Examples of integrated channels include integrated hole volume (IHV) obtained from caliper(s), integrated cement volume (ICV) obtained from caliper(s) and FCS (future casing size), and integrated transit time (ITT) obtained from sonic DT/DTL/DTS. In one or more embodiments of the invention, the integration (380) sub-component may include the following information for each integration: the input channel(s) that affect each integration, a description of the integrated channel(s), a start and stop index over which the corresponding integration was computed, and the final value of the integration expressed in the appropriate units.

In one or more embodiments of the invention, the main log (382) sub-component may include a visual representation (i.e., the main log) of the well logging data. In one or more embodiments of the invention, the main log (382) sub-component includes a visual representation of well logging data obtained from one or more channels of the well logging tool for a particular run (which may include multiple passes). In one or more embodiments of the invention, the well logging data, for one or more channels, is displayed for the entire depth of the borehole.

In one or more embodiments of the invention, the concise parameters (384) sub-component may include well logging information about specific borehole parameters, such as, fluid density, matrix density, borehole status, matrix for neutron porosity, etc. Those skilled in the art will appreciate that other borehole parameters may be listed in the concise parameters (384) sub-component. In one or more embodiments of the invention, the concise parameters (384) sub-component may include the following well logging information for each of the listed borehole parameters: name, output channels affected by the setting of that parameter, description, value, and unit associated with the value.

In one or more embodiments of the invention, the zoned parameters (386) sub-component may include information about specific borehole parameters (e.g., fluid density, matrix density, borehole status, matrix for neutron porosity, etc.) at specific zones (e.g., depth intervals in the borehole). In one or more embodiments of the invention, the zoned parameters (386) sub-component may include the following well logging information for each of the listed zone parameters: top index (i.e., depth designated as the top of the zone), bottom index (i.e., depth designed as the bottom of the zone), name, and value.

In one or more embodiments of the invention, the tool-control parameters (388) sub-component may include well logging information about specific equipment parameters (e.g., parameters for one or more well logging tools used to obtain the well logging data). In one or more embodiments of the invention, the tool-control parameters (388) sub-component may include the following information about each tool-control parameter: parameter name (e.g., DPPM), parameter description (e.g., density porosity processing mode), value (e.g., STAN), value description or unit (e.g., density vertical sample date=6").

In one or more embodiments of the invention, the environmental correction parameters (390) sub-component may include well logging information about the environmental correction parameters used in obtaining the well logging information (which includes will logging data) for the particular run. In one or more embodiments of the invention, the environmental correction parameters (390) sub-component includes, for example, the following well logging information for each environmental correction parameter used during the particular run: channel name (e.g., TNPH, NPOR), correction type (e.g., mud weight correction), status (e.g., applied), input (e.g., drilling fluid density), and value (e.g., 15.4 lbm/gal). In some embodiments, the environmental correction parameters may include tool correction/calibration factors that may be applied before computing corrections for well and environment related factors.

In one or more embodiments of the invention, the detailed calibration record (392) sub-component includes information about the calibration for each well logging tool used for a particular run. In one or more embodiments of the invention, the following well logging information may be included for each well logging tool: information about the specific well logging tool being calibrated (e.g., description of component, asset code, serial number, etc.), information about auxiliary equipment being calibrated (e.g., description of component, asset code, serial number, etc.), information used to identify a master calibration record, information used to identify a pre-calibration record (i.e., measurements take before the calibration), and information used to identify an post-calibration record (i.e., measurements take after the calibration).

In one or more embodiments of the invention, the following well logging information may be included in the detailed calibration record (392) sub-component to identify the master calibration record, the pre-calibration record, and the post-calibration record: information about the software version used in the calibration system, a unique ID identifying calibration data associated with the specific calibration record (i.e., the master calibration record, the pre-calibration record, and the post-calibration record), date of calibration, time of calibration, overall result of calibration (e.g., in tolerance/outside tolerance, or quality index), information about the individual who performed the calibration, information about the calibration facility, and information about the source of the calibration data (e.g., measured).

In one or more embodiments of the invention, the detailed calibration record (392) sub-component may include the following detailed information about the specific calibration measurements contained in the master calibration, the pre-calibration record, and the post-calibration record of the specific well logging tool being calibrated: description of measurement (e.g., measurement of a particular sensor in particular calibration environment), minimum/nominal/maximum for measurement, corresponding master measurement, corresponding pre-calibration measurement, difference between corresponding master measurement and corresponding pre-calibration measurement, corresponding post-calibration measurement, difference between corresponding pre-calibration measurement and corresponding post-calibration measurement.

In one or more embodiments of the invention, the concise calibration record (394) sub-component may include a summary of the well logging information displayed in the detailed calibration record (392) sub-component discussed above. In one or more embodiments of the invention, the concise calibration record (394) sub-component graphically may display the summary of the well logging information displayed in the detailed calibration record (392) sub-component. For example, if a given well logging tool is operating within the specified tolerance, then the concise calibration record (394) sub-component may display a green circle next to the name of the well logging tool, which indicates that the particular well logging tool is operating within the specified tolerance. Similarly, if the well logging tool is operating outside the specified tolerance, a red circle may be placed next to the name of the particular well logging tool.

In one or more embodiments of the invention, the splicing information (396) sub-component may include information about the splicing information used to combine various well logging data. The information included within the splicing information (396) sub-component may vary depending on the well the type of splicing model used (e.g., per-channel splicing model, straight-line splicing model).

In one or more embodiments of the invention, the tail component (360) may include a summary of information included within the header component (352). In one or more embodiments of the invention, the tail component (360) may include such information as the customer name, information about the field in which the logged well is located, information about the logged well (e.g., the unique well ID, etc.), etc.

Those skilled in the art will appreciate that the contents of the deliverable files shown in FIG. 7 are for illustration only and are not intended to limit the content of secure deliverable files. For example, in accordance with some embodiments of the invention, the deliverable files may be non-secure deliverable files. Further, a given deliverable file may include any combination of the aforementioned components and any combination of the aforementioned sub-components.

Figure 8:
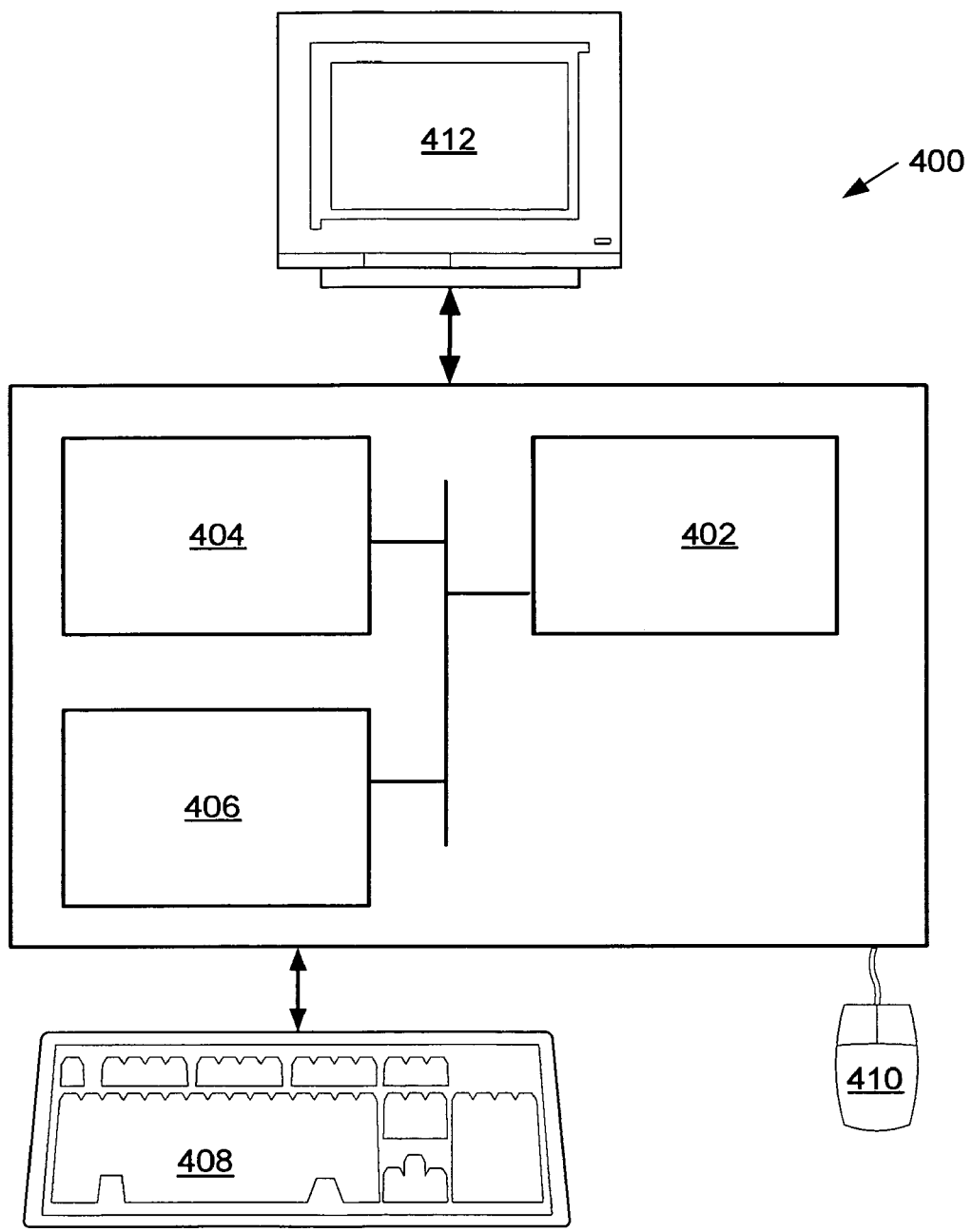
FIG. 8 shows a prior art computer system that can be used with one embodiment of the invention.

An embodiment of the invention may be implemented on virtually any type of computer regardless of the platform used. For example, as shown in FIG. 8, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a local area network (LAN), a wide area network, (WAN) or internet via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage medium.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A method for generating deliverable files from well logging data, comprising:
   obtaining the well logging data, wherein the well logging data is associated with a unique identifier;
   outputting a graphical deliverable file based on the well logging data, one or more templates, and a set of graphical deliverable attributes, wherein the one or more templates and the set of graphical deliverable attributes specify how the graphical deliverable file is generated; and outputting to a computer-readable medium an electronic data file comprising the set of graphical deliverable attributes such that the graphical deliverable file can be regenerated from the electronic data file.

2. The method of claim 1, wherein the well logging data comprise raw data, acquisition settings, computational parameters, and computed outputs.

3. The method of claim 1, further comprising regenerating the graphical deliverable file from the electronic data file.

4. The method of claim 1, further comprising verifying that the graphical deliverable file corresponds to the electronic data file.

5. The method of claim 1, wherein the graphical deliverable file is a physical print or a digital graphical file.

6. The method of claim 1, wherein the electronic data file is a DLIS file.

7. The method of claim 1, wherein the electronic data file is in a secure format.

8. The method of claim 7, wherein the secure format is a Portable Data File (PDF) format.

9. The method of claim 8, wherein the PDF format includes password protection.

10. The method of claim 9, wherein the password protection is based on a randomly generated password.

11. The method of claim 1, wherein the generating the graphical deliverable file comprises:
populating at least one of the one or more templates with the well logging data to produce at least one component; and
assembling the at least one component to produce the graphical deliverable file.

12. The method of claim 1, further comprising:
modifying an attribute of the graphical deliverable file; and
saving the modified attribute in the electronic data file.

13. The method of claim 1, wherein the graphical deliverable file and the electronic data file each include a unique identifier.

14. The method of claim 1, wherein the outputting the graphical deliverable files comprises modifying the well logging data based on tier information.

15. A system for generating a deliverable file from well logging information, comprising:

a data repository storing data that include well logging data, wherein the well logging data is associated with a unique identifier; and
a deliverable generation component configured to:
obtain the well logging data from the data repository,
output a graphical deliverable file based on the well logging data, one or more templates, and a set of graphical deliverable attributes, wherein the one or more templates and the set of graphical deliverable attributes specify how the graphical deliverable file is generated, and
output to a computer-readable medium an electronic data file comprising the set of graphical deliverable attributes such that the graphical deliverable file can be regenerated from the electronic data file.

16. The system of claim 15, wherein the well logging data comprise raw data, acquisition settings, computational parameters, and computed outputs.

17. The system of claim 15, wherein the graphical deliverable file is a physical print or a digital graphical file.

18. The system of claim 15, wherein the electronic data file is a DLIS file.

19. The system of claim 15, wherein the electronic data file is in a secure format.

20. The system of claim 19, wherein the secure format is a Portable Data File (PDF) format.

21. The system of claim 20, wherein the PDF formation includes password protection.

22. The system of claim 21, wherein the password protection is based on a randomly generated password.

23. The system of claim 15, wherein the deliverable generation component is configured to output the graphical deliverable file by:
populating at least one of the one or more templates with the well logging data to produce at least one component; and
assembling the at least one component to produce the graphical deliverable file.

24. The system of claim 15, wherein the graphical deliverable file and the electronic data file each include a unique identifier.

* * * * *